United States Patent [19]
McBride, Jr.

[11] 3,987,772
[45] Oct. 26, 1976

[54] SELF-REGULATING HEATER

[75] Inventor: Lyle E. McBride, Jr., Norton, Mass.

[73] Assignee: Texas Instruments Incorporated, Dallas, Tex.

[22] Filed: Mar. 10, 1975

[21] Appl. No.: 557,142

[52] U.S. Cl. .............................. 123/122 F; 219/206
[51] Int. Cl.$^2$ ............................................. F02M 31/00
[58] Field of Search......... 123/122 F, 122 H, 119 F, 123/122 AA, 119 E; 219/206, 207

[56] References Cited
UNITED STATES PATENTS

| | | | |
|---|---|---|---|
| 2,587,713 | 3/1952 | Elliot.............................. | 123/122 F |
| 3,806,854 | 4/1974 | Armstrong...................... | 123/119 F |

*Primary Examiner*—Ronald H. Lazarus
*Attorney, Agent, or Firm*—John A. Haug; James P. McAndrews; Russell E. Baumann

[57] ABSTRACT

A self-regulating electrically heated positive-temperature-coefficient (hereinafter PTC) carburetor stove for use in the fuel entry system of a gasoline engine is connected through the ignition system directly to the battery for rapidly heating of the stove upon starting of the car. The system comprises a plurality of PTC pills housed in and insulated from a container with a high thermal conductivity top plate in direct heat transfer relation with the pills. Gasoline droplets are evaporated on this plate during cold start conditions to minimize the need to run a cold engine in the closed choke gasoline rich mode. During heat-up of the engine the PTC pills reach the anomaly temperature and at that point greatly increase their resistance thereby virtually terminating the power requirement of the stove in the heated engine mode.

11 Claims, 3 Drawing Figures

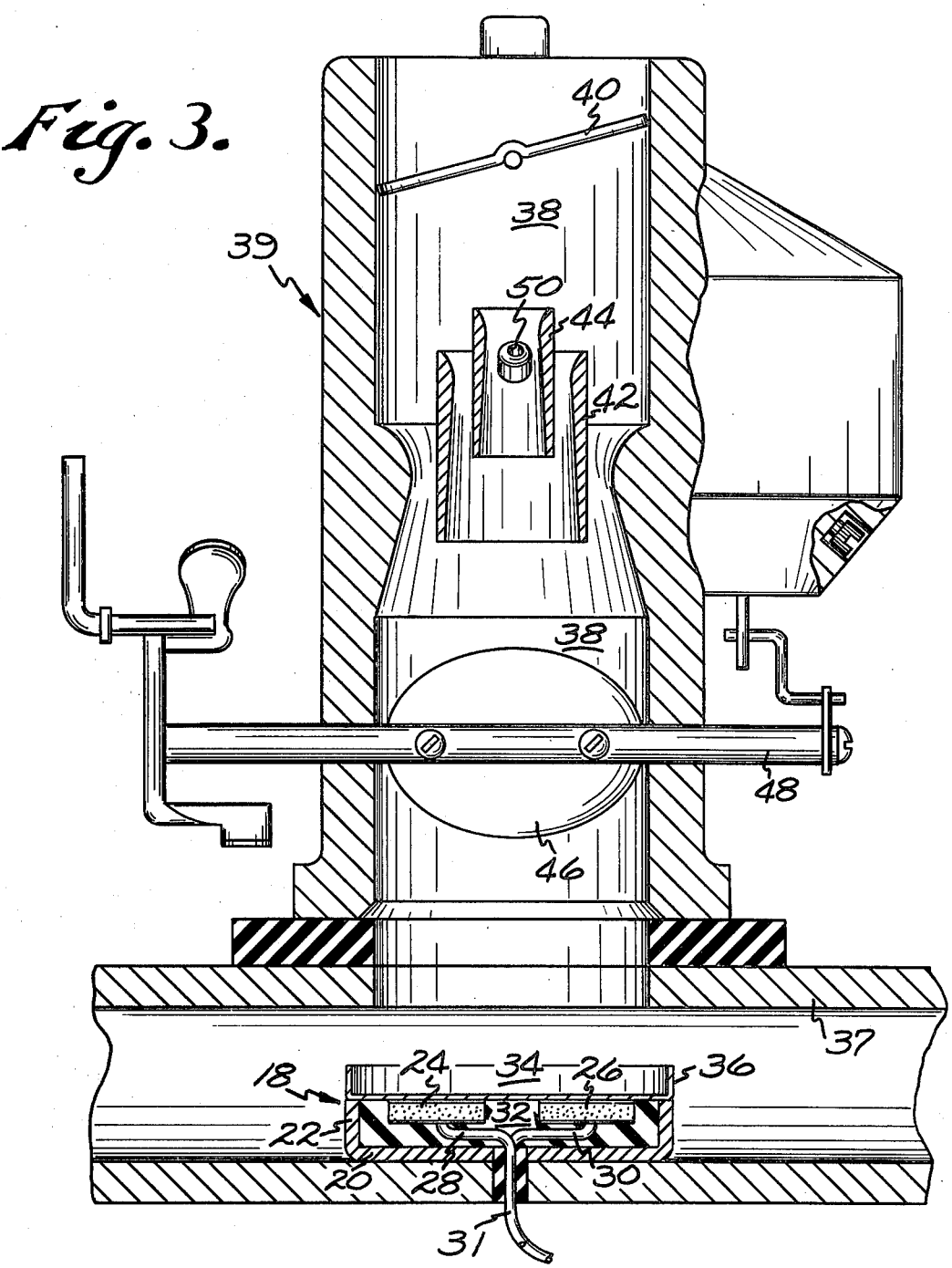

SELF-REGULATING HEATER

BACKGROUND AND SUMMARY OF INVENTION

This invention relates to a self-regulating electrically heated stove for use in an internal combustion engine and more particularly for a PTC stove for use in the fuel entry system of a gasoline engine.

When starting a cold gasoline engine, a closed-choke gasoline-rich mixture with air is needed for operation because only a small amount of the gasoline is vaporized and therefore readily combustible at this temperature. This condition causes large amounts of carbon monoxide and unburned hydrocarbons to be produced which wastes fuel and causes pollution of the atmosphere.

In order to minimize the time of operation with the gasoline-rich mixture, current systems typically use exhaust gas to heat up a "hot spot" where the gasoline enters the engine (i.e. intake manifold) from the carburetor. These systems coupled with an electrically heated quick choke which opens quicker upon starting than the more conventional chokes previously used reduce the time needed to run the gasoline-rich mixture, but still have not solved the problem altogether. The exhaust system itself has a built-in lag time for it to heat up and therefore only partially corrects the problem. Also, because of the corrosive nature of the exhaust gas, corrosion problems result or the use of more expensive corrosion resistant materials is needed. Finally, the exhaust gas must be switched away from the engine when the engine heats up thus requiring a switching valve and additional piping with the associated sealing problems.

It is an object of this invention to provide means to raise the temperature of gasoline within the fuel entry system of a gasoline engine which minimizes the time for operating of the engine with a gasoline rich fuel charge. Another object of this invention is to provide a heater in which the heater is shielded from the gasoline. Still another object of this invention is to provide a heater within the fuel entry system of a gasoline engine which is self-regulating and one which can even do away with the need for a choke mechanism. Still another object of this invention is to provide a self-regulating heater that is economical to produce and works in coordination with standard carburetors. Other objects and features of this invention will be in part apparent and in part pointed out hereinafter.

Briefly, the self-regulating PTC heater stove of this invention comprises a container with one or more PTC pills as heaters anchored therein and insulated from the container. The Pills are electrically connected by wire leads to the battery through the ignition system. The container is positioned so that gasoline coming from the carburetor will come into contact with the heater and be heated thus causing the gasoline to evaporate. A thin sheet of copper foil which is in direct heat transfer relation with the pills forms a top plate for the stove. The plate has rimmed edges so it can catch and hold the gasoline while the vaporizing is taking place.

The heater in a fuel entry system of a gasoline engine will cause more of the gasoline to evaporate and thereby make cold engine operation much more efficient and pollution free. As the engine heats up so that the gasoline naturally evaporates for efficient running of the engine, the anomaly temperature of the PTC pills is reached thus causing the resistance of the pills to greatly increase thereby nearly halting the power requirement of the stove.

BRIEF DESCRIPTION OF THE DRAWINGS

FIG. 3 shows a cross-sectional view of a fuel entry system of a gasoline engine with the self-regulating PTC heater stove contained therein.

DESCRIPTION OF THE PREFERRED EMBODIMENT

Figure 1:
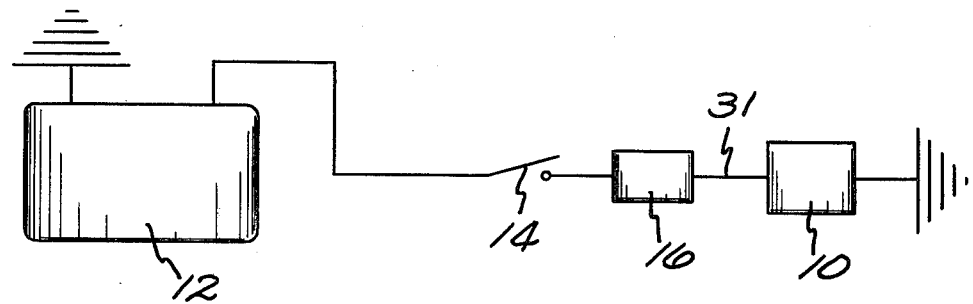
FIG. 1 is an electrical diagram showing schematically the self-regulating PTC heater stove of this invention with an optional thermostat in the starting circuitry of an automobile.

Referring now to the drawings, FIG. 1 shows a PTC heater stove 10 of this invention schematically in the electrical starting circuitry of an automobile. Stove 10 receives current from a battery 12 when an ignition switch 14 is closed upon starting a car. Thus, upon engaging the ignition switch to start the car, the stove starts to heat up and therefore vaporize gasoline in contact with it. A thermostat 16 may be used to break the circuit at a specific temperature which will be discussed fully below. To complete the circuit both stove 10 and battery 12 may be grounded through the frame of the car as shown.

Figure 2:
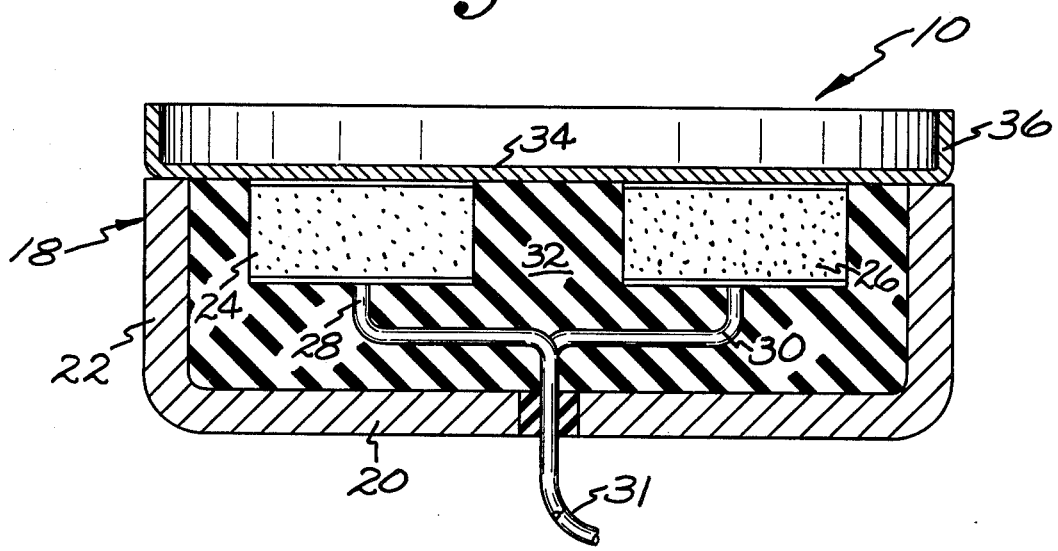
FIG. 2 is a cross-sectional view of the PTC heater stove of this invention.

Stove 10 as shown in FIGS. 2 and 3 comprises a container 18 with a bottom wall 20 and upstanding sidewalls 22 forming an open ended parallelepiped. Container 18 may be made from a relatively high temperature, sturdy material such as low carbon steel.

Within container 18 are housed 2 heating element thermistor pills 24, 26. These pills preferably are a ceramic wafer comprising semiconducting barium titanate, such as $Ba_{0.997} La_{0.003} TiO_3$. Once an anomaly temperature is reached, the pills generate heat at a substantially constant temperature in response to electrical energization thereof and have a steeply sloped positive temperature coefficient of resistance at temperatures above this anomaly temperature. It is within the purview of this invention to use any number of the PTC thermistor pills that are desired. These PTC pills 24, 26 are of a conventional type to each of which has been secured a "hot" lead wire 28, 30 and a ground lead wire (not shown) leading to container 18. It is understood that the PTC pills 24, 26 have been previously metallized in well-known manner so that the leads 28, 30 and the ground wires can be secured thereto by soldering or the like. Wires 28, 30 are insulated and extend out of container 18 as one wire 31 to connect with battery 12 as shown in FIG. 1.

PTC pills 24, 26 are insulated from container 18 by an insulating material 32 which does not cause degradation of the pills such as magnesia. Insulating material 32 both electrically and thermally insulates the pills from the container.

A top cover 34 rests on top of PTC pills 24, 26 so as to be in direct heat transfer relationship with them. Cover 34 may be directly in contact with the top surface of pills 24, 26 and therefore act as an electrical ground for them thereby doing away with the necessity of aforementioned ground wires. Cover 34 is preferably a thin sheet of material with high thermal conductivity such as copper foil. Cover 34 has a lip portion 36 to prevent gasoline from running or skating off the stove cover and to catch and hold gasoline to be evaporated.

To further prevent such skating off, a wire mesh (not shown) can be brazed to the top surface of the cover. Top cover 34 is attached to container 18 by any conventional means such as by welding. The top cover and container shield the pills 24, 26 from the gasoline.

FIG. 3 shows a preferred placement of stove 10 within the fuel entry system of an automotive engine. Container 18 is attached as by welding to the intake manifold 37 directly across and in alignment with the entrance of the carburetor passageway or barrel 38 of a carburetor 39. Air enters passageway 38 as permitted by choke butterfly valve 40, passing through a main venturi 42 and a boost venturi 44 at which point gasoline is introduced through orifice 50 to mix with the air and pass as allowed by throttle valve 46 into intake manifold 37. Throttle valve 46 is connected by linkage 48 to the throttle of the internal combustion engine. Upon engaging the ignition switch of a cold gasoline engine, electrical power from battery 12 is instantly supplied to PTC pills 24, 26. The pills in turn heat up and supply heat to cover 34. The heat-up time of the pills is essentially instantaneous and because of the small thermal mass and high thermal conductivity of the cover the heat-up time for the cover is also short. This fact allows the cover to start heating the gasoline droplets falling on it and vaporizing them almost instantaneously upon activation of the ignition switch. Thus, the period of time the engine must operate with a fuel-rich mixture can be limited to a very short period during the starting process. It is even possible with a pre-heat step prior to starting to d0 away with the need for a choke altogether.

When the engine temperature causes the PTC pills to reach their preselected anomaly temperature, the resistance of the pills will greatly increase thereby virtually terminating the power requirement of the stove in the heated engine mode. Thus the pills exhibit the properties of having a built-in thermostat. In the event that it is desired to completely deenergize the stove, an inexpensive thermostat as shown in FIG. 1 can be used to achieve this result.

Thus, a unique PTC heat stove positioned to heat the fuel in the fuel entry system of a gasoline engine has been disclosed so as to be able to eliminate the necessity of operating a conventional internal combustion engine with a gasoline-rich mixture except during starting.

Various changes and modifications in the abovedescribed device will be readily apparent to those skilled in the art such as changes in the positioning of the pills within the intake manifold or carburetor. Any of such changes or modifications are deemed to be within the spirit and scope of the present invention as set forth in the appended claims.

I claim:

1. In fuel entry system of an internal combustion engine wherein the improvement comprises a carburetor having a barrel through which fuel is adapted to pass, a stove disposed in the intake manifold in alignment with said barrel, the stove comprising a self-regulating heater element having a steeply sloped positive temperature coefficient of resistivity, and means to electrically connect the element to a power supply so that shortly after energization thereof the element is maintained at an essentially constant pre-selected temperature whereby fuel droplets coming in contact with the stove will be vaporized to enhance start-up operation of the internal combustion engine.

2. A fuel entry system of an internal combustion engine as set forth in claim 1 wherein said stove has a thermally conductive cover to shield said element from said fuel droplets, said cover being in direct heat transfer relationship with said element.

3. A fuel entry system of an internal combustion engine as set forth in claim 2 wherein said stove comprises a plurality of elements having steeply sloped positive temperature coefficients of resistivity.

4. A fuel entry system of an internal combustion engine as set forth in claim 3 further providing said cover has catching and cumulating means.

5. A fuel entry system of an internal combustion engine as set forth in claim 4 wherein said catching and cumulating means is a flat top surface with a rim around the outside perimeter of the top surface.

6. A fuel entry system of an internal combustion engine as set forth in claim 5 wherein said carburetor unit is of conventional design with choke and throttle valves.

7. A self-regulating heater in combination with a fuel entry system of a gasoline engine comprising an open ended container, at least one thermistor heater contained within and insulated from said container and electrically connected to a power source, said heater adapted to generate heat at a substantially constant temperature in response to electrical engerization thereof and having a steeply sloped positive temperature coefficient of resistance at a temperature above an anomaly temperature thereby virtually terminating the power requirement of the stove above said anomaly temperature, and a thermally conductive cover closing said open ended container, said cover being in heat transfer relationship with said heater in order to evaporate gasoline droplets which exit from said fuel entry system.

8. A self-regulating heater for use within the fuel entry system of a gasoline engine as set forth in claim 7 wherein said thermistor heater includes a ceramic wafer comprising semiconducting barium titanate.

9. A self-regulating heater for use within the fuel entry system of a gasoline engine as set forth in claim 8 where said ceramic wafer comprises $Ba_{0.997} La_{0.003} TiO_3$.

10. A self-regulating heater for use within the fuel entry system of a gasoline engine as set forth in claim 7 further providing said cover has catching and cumulating means.

11. A self-regulating heater for use within the fuel entry system of a gasoline engine as set forth in claim 10 wherein said catching and cumulating means is a flat top surface with a rim around the outside perimeter of the top surface.

* * * * *